US008880078B2

(12) United States Patent
Kim et al.

(10) Patent No.: US 8,880,078 B2
(45) Date of Patent: Nov. 4, 2014

(54) METHOD OF LOGGING MEASUREMENT RESULT AT HANDOVER FAILURE IN WIRELESS COMMUNICATION SYSTEM

(75) Inventors: Sunhee Kim, Gyeonggi-Do (KR); Sunghoon Jung, Gyeonggi-Do (KR); Seungjune Yi, Gyeonggi-Do (KR); Sungduck Chun, Gyeonggi-Do (KR); Sungjun Park, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 9 days.

(21) Appl. No.: 13/321,482

(22) PCT Filed: Jun. 25, 2010

(86) PCT No.: PCT/KR2010/004162
§ 371 (c)(1),
(2), (4) Date: Nov. 18, 2011

(87) PCT Pub. No.: WO2010/151089
PCT Pub. Date: Dec. 29, 2010

(65) Prior Publication Data
US 2012/0064886 A1 Mar. 15, 2012

Related U.S. Application Data

(60) Provisional application No. 61/220,590, filed on Jun. 26, 2009, provisional application No. 61/232,777, filed on Aug. 10, 2009, provisional application No. 61/233,806, filed on Aug. 13, 2009.

(51) Int. Cl.
*H04W 36/30* (2009.01)
*H04W 24/04* (2009.01)

(52) U.S. Cl.
CPC .................................. *H04W 24/04* (2013.01)
USPC .......................................... 455/443; 370/332

(58) Field of Classification Search
CPC ......................... H04W 36/30; H04W 36/0088
See application file for complete search history.

(56) References Cited

U.S. PATENT DOCUMENTS

| 6,816,729 | B1 * | 11/2004 | Halonen ........................ 455/436 |
| 2002/0032034 | A1 | 3/2002 | Tiedemann et al. |
| 2007/0099618 | A1 * | 5/2007 | Kim ................. 455/436 |
| 2008/0268833 | A1 * | 10/2008 | Huang et al. .................. 455/425 |
| 2009/0191874 | A1 * | 7/2009 | Du et al. ........................ 455/436 |
| 2009/0215459 | A1 * | 8/2009 | Kuo ................ 455/436 |
| 2010/0172301 | A1 * | 7/2010 | Watfa et al. .................... 370/328 |

(Continued)

FOREIGN PATENT DOCUMENTS

| CN | 1852533 A | 10/2006 |
| CN | 101128057 A | 2/2008 |

(Continued)

*Primary Examiner* — Rafael Pérez-Gutiérrez
*Assistant Examiner* — Frank Donado
(74) *Attorney, Agent, or Firm* — Mckenna Long & Aldridge LLP

(57) ABSTRACT

Disclosed is related to a wireless communication system and a mobile terminal providing a wireless communication service and to a method by which a base station and a mobile terminal transmit and receive data in an evolved universal mobile telecommunications system (E-UMTS) evolved from universal mobile telecommunications system (UMTS), a long term evolution (LTE) system, or a LTE-advanced (LTE-A) system and more particularly, to a method of logging a measurement result at a handover failure.

5 Claims, 8 Drawing Sheets

(56) References Cited

U.S. PATENT DOCUMENTS

| | | | |
|---|---|---|---|
| 2010/0267378 A1* | 10/2010 | Hamabe et al. | 455/423 |
| 2010/0279695 A1* | 11/2010 | Amirijoo et al. | 455/438 |
| 2011/0090869 A1* | 4/2011 | Tian et al. | 370/331 |
| 2011/0177815 A1* | 7/2011 | Jeong et al. | 455/436 |
| 2011/0195707 A1* | 8/2011 | Faerber et al. | 455/423 |

FOREIGN PATENT DOCUMENTS

| | | |
|---|---|---|
| KR | 10-0326172 B1 | 2/2002 |
| KR | 10-2006-0034556 A | 4/2006 |
| KR | 10-2006-0035200 A | 4/2006 |
| KR | 10-2007-0053030 A | 5/2007 |
| KR | 10-0747460 B1 | 8/2007 |

* cited by examiner

METHOD OF LOGGING MEASUREMENT RESULT AT HANDOVER FAILURE IN WIRELESS COMMUNICATION SYSTEM

This application is a 35 U.S.C. §371 National Stage entry of International Application No. PCT/KR2010/004162, filed on Jun. 25, 2010, and claims the benefit of U.S. Provisional Patent Application Nos. 61/220,590, filed Jun. 26, 2009, 61/232,777 filed Aug. 10, 2009, and 61/233,806, filed Aug. 13, 2009, each of which are hereby incorporated by reference in their entireties as if fully set forth herein.

TECHNICAL FIELD

The present invention relates to a wireless communication system and a mobile terminal providing a wireless communication service and to a method by which a base station and a mobile terminal transmit and receive data in an evolved universal mobile telecommunications system (E-UMTS) evolved from universal mobile telecommunications system (UMTS), a long term evolution (LTE) system, or a LTE-advanced (LTE-A) system and more particularly, to a method of logging a measurement result at a time of handover failure.

BACKGROUND ART

FIG. 1 is a view illustrating a network architecture of an Evolved Universal Terrestrial Radio Access Network (E-UTRAN), which is a mobile communication system to which the related art and the present invention are applied. The E-UTRAN system has evolved from the existing UTRAN system, and a basic standardization work thereof is currently going on in 3GPP. The E-UMTS system may be also referred to as a Long Term Evolution (LTE) system.

The E-UTRAN includes a plurality of e-NBs (e-NodeB; hereinafter, referred to as "base station"), and the plurality of eNBs are connected to one another through an X2 interface. The eNB is connected to user equipment (hereinafter, referred to as "UE") via a wireless interface, and connected to an Evolved Packet Core (EPC) through an S1 interface.

The EPC may include a Mobility Management Entity (MME), a Serving-Gateway (S-GW), and a Packet Data Network-Gateway (PDN-GW). The MME has information on the connection of UE or the capability of UE, and such information is primarily used for the mobility management of the UE. The S-GW is a gateway having E-UTRAN as an end point, and the PDN-GW is a gateway having PDN as an end point.

The radio interface protocol layers between UE and a network can be divided into a first layer (L1), a second layer (L2) and a third layer (L3) based on three lower layers of an Open System Interconnection (OSI) reference model widely known in communications systems. A physical layer belonging to the first layer provides information transfer services using a physical channel, and a radio resource control (hereinafter, referred to as "RRC") layer located at the third layer plays a role of controlling radio resources between UE and a network. For the purpose of this, the RRC layer exchanges RRC messages between UE and a network.

FIGS. 2 and 3 are views illustrating an architecture of a radio interface protocol between UE and a base station based on the 3GPP radio access network standard. The radio interface protocol horizontally includes a physical layer, a data link layer, and a network layer, and vertically divided into a user plane (U-plane) for transmitting data information and a control plane (C-plane) for transferring a control signaling. The protocol layers of FIGS. 2 and 3 can be divided into a first layer (L1), a second layer (L2) and a third layer (L3) based on three lower layers of an Open System Inter-connection (OSI) reference model widely known in communications systems. Those radio protocol layers exist as a pair in the UE and the E-UTRAN to perform a data transmission for the radio section.

Hereinafter, each layer in a radio protocol control plane of FIG. 2 and a radio protocol user plane of FIG. 3 will be described.

The first layer as a physical layer provides an information transfer service to an upper layer using a physical channel. The physical layer is connected to its upper layer, called a Medium Access Control (MAC) layer, via a transport channel, and data is transferred between the MAC layer and the physical layer via the transport channel. Furthermore, data is transferred via a physical channel between different physical layers, in other words, between the physical layer of a transmitting side and the physical layer of a receiving side. The physical channel is modulated by an Orthogonal Frequency Division Multiplexing (OFDM) scheme and time and frequency are used as radio resources for the channel.

The Medium Access Control (hereinafter, referred to as "MAC") layer located at the second layer provides a service to its upper layer, called a Radio Link Control (hereinafter, referred to as "RLC") layer, via a logical channel. The RLC layer of the second layer supports reliable data transmissions. The function of the RLC layer may be implemented as a functional block in the MAC layer. In this case, the RLC layer may not exist. A Packet Data Convergence Protocol (PDCP) layer of the second layer is used to efficiently transmit IP packets, such as IPv4 or IPv6, in the radio section having a relatively small bandwidth. For this purpose, the PDCP layer performs a header compression function for reducing the size of an IP packet header, which is relatively large in size and includes unnecessary control information.

A Radio Resource Control (hereinafter, referred to as "RRC") layer located at the uppermost portion of the third layer is only defined in the control plane. The RRC layer takes charge of controlling logical channels, transport channels and physical channels in relation to the configuration, re-configuration and release of Radio Bearers (RBs). Here, the RB denotes a service provided by the second layer to perform a data transmission between the UE and the UTRAN. If an RRC connection is established between a RRC layer of the UE and a RRC layer of the UTRAN, then the UE is in an RRC_CONNECTED state. Otherwise, the UE is in an RRC_IDLE state.

Downlink transport channels for transmitting data from a network to UE may include a Broadcast Channel (BCH) for transmitting system information, and a downlink Shared Channel (SCH) for transmitting other user traffic or control messages. In case of traffic or control messages of a downlink multicast or broadcast service, they may be transmitted either via a downlink SCH, or via a separate downlink Multicast Channel (MCH). On the other hand, uplink transport channels for transmitting data from UE to a network may include a Random Access Channel (RACH) for transmitting an initial control message and an uplink Shared Channel (SCH) for transmitting user traffic or control messages.

Logical channels which are located at an upper level of transport channels and mapped to the transport channels may include a Broadcast Control Channel (BCCH), a Paging Control Channel (PCCH), a Common Control Channel (CCCH), a Multicast Control Channel (MCCH), a Multicast Traffic Channel (MTCH), and the like.

A physical channel includes multiple sub-frames arranged on a time axis and multiple sub-carriers arranged on a frequency axis. Here, a sub-frame includes a plurality of symbols on the time axis. A sub-frame includes a plurality of resource blocks each including a plurality of symbols and a plurality of sub-carriers. Also, each sub-frame can use particular sub-carriers of particular symbols (e.g., a first symbol) in the relevant sub-frame for a Physical Downlink Control Channel (PDCCH), that is, a L1/L2 control channel. A sub-frame has a time duration of 0.5 ms. A Transmission Time Interval (TTI) as a unit time for transmitting data is 1 ms, corresponding to two sub-frames.

In a related art, if a terminal fails to perform a handover procedure due to an existence of a coverage hole, the terminal must revert from configured channel information of a target cell to previously stored configuration information of a serving cell. Thereafter, the terminal notifies the handover failure to the network. However, the network does not know when, how and where the terminal fails to perform the handover procedure. However, what the network actually needs to know is when, how and where the handover failure is happened, thereby allowing the network to establish a network structure (e.g., a mobility management or reestablish a cell capacity) in effective manner.

DISCLOSURE OF INVENTION

Solution to Problem

Therefore, an object of the present invention is to effectively establish network's set up using terminal's measurement logs with a minimal number of driving test in a wireless communication system.

According to the present invention, the terminal may log a measurement result at a time of handover failure. Such measurement logging may be used to establish the set up of the network with the minimal number of driving test in MDT scheme.

To achieve these and other advantages and in accordance with the purpose of the present invention, as embodied and broadly described herein, there is provided a method of transmitting a measurement result at a handover failure in a wireless communication system, the method comprising: receiving, from a first network, a measurement configuration (MDT configuration) to be used at detecting the handover failure; detecting the handover failure; storing a measurement result if the handover failure is detected; and transmitting the stored measurement result to a second network.

The foregoing and other objects, features, aspects and advantages of the present invention will become more apparent from the following detailed description of the present invention when taken in conjunction with the accompanying drawings.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

MODE FOR THE INVENTION

Figure 1:
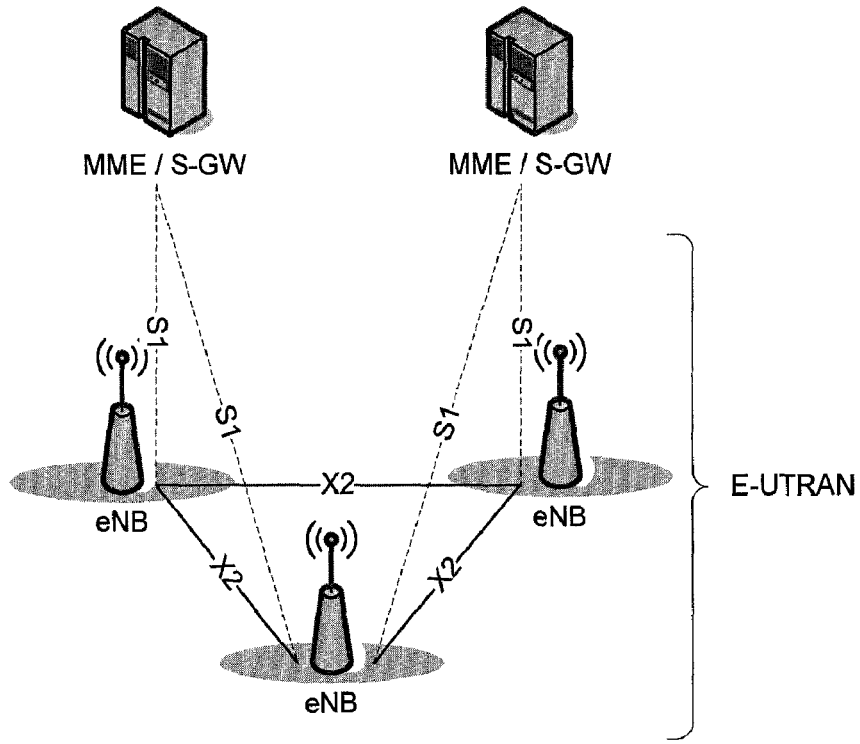
FIG. 1 shows an exemplary network structure of an Evolved Universal Mobile Telecommunications System (E-UMTS) as a mobile communication system to which a related art and the present invention are applied.
Figure 2:
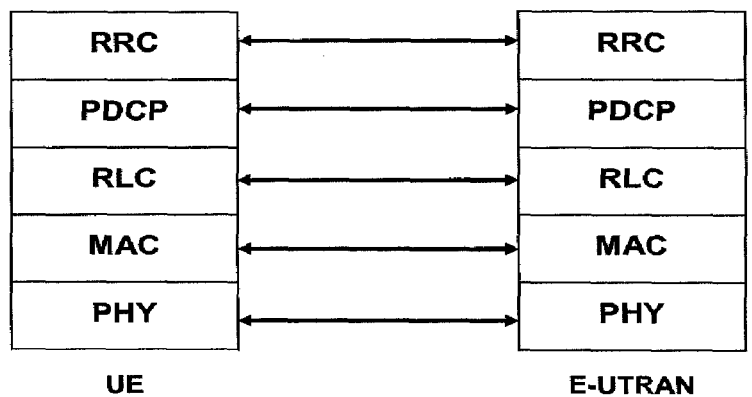
FIG. 2 shows an exemplary view of related art control plane architecture of a radio interface protocol between a terminal and an E-UTRAN.
Figure 3:
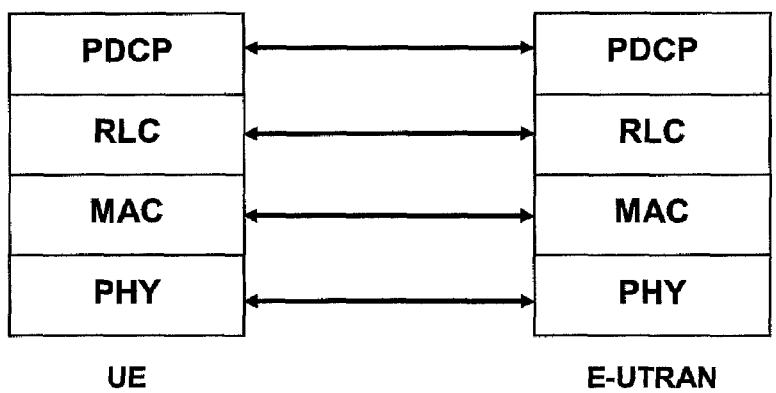
FIG. 3 shows an exemplary view of related art user plane architecture of a radio interface protocol between a terminal and an E-UTRAN.

One aspect of this disclosure relates to the recognition by the present inventors about the problems of the related art as described above, and further explained hereafter. Based upon this recognition, the features of this disclosure have been developed.

Although this disclosure is shown to be implemented in a mobile communication system, such as a UMTS developed under 3GPP specifications, this disclosure may also be applied to other communication systems operating in conformity with different standards and specifications.

Hereinafter, description of structures and operations of the preferred embodiments according to the present invention will be given with reference to the accompanying drawings.

Firstly, a description of measurement will be given as following. In a mobile communication system, it is essentially required to support the mobility of the UE. To support the mobility, the UE continues to measure the quality of a serving cell currently providing a service, and the quality for a neighboring cell adjacent to the serving cell. The UE transmits the measured result to a network at a suitable time, and the network provides the optimum mobility to the UE through a handover command, and the like, based on the measurement result value reported by the UE.

In addition to the purpose of mobility support, a mobile communication terminal performs a special purposed measurement procedure that has been set by a network to provide information capable of helping the service provider to administer a network, and then reports the measurement result to the network. For example, the UE receives broadcast information of a specific cell determined by a network to acquire identifier information of this cell (for example, global cell identity) or location identification information to which the relevant cell belongs (for example, the location of the UE using GPS or Cell id) and other cell information (for example, member or non-member in case of a closed subscriber group (CSG)), and then reports those information to the serving cell. Alternatively, in case where the UE confirms that the quality of a specific area is very bad during the movement, the UE may report the location information and measurement results for the cells having bad qualities to the network after the UE finds a suitable cell or the UE has connection with the network if the connection between the UE and the network has been lost due to the bad radio condition. A network may seek the optimization of the network based on the measurement result reports from the UEs for helping the management of the network.

In the form of managing a mobile communication system having a frequency reuse factor of 1, mobility is mostly implemented between different cells having the same frequency. Accordingly, in order to guarantee the mobility of the UE, the UE should be able to easily find cells having the same center frequency as the serving cell, and should be able to easily measure the quality and cell information of the found neighboring cells. The measurement for a cell using the same center frequency as the center frequency of the serving cell is called intra-frequency measurement. The UE performs intra-frequency measurement to report the measurement result at a suitable time, thereby accomplishing an object of the relevant measurement result.

The mobile communication service provider may manage a network using several frequencies. In case where a service of the mobile communication system is provided through one frequency and the service can be provided through other frequencies, in order to guarantee the optimized mobility to the UE, the UE should be also able to find cells having a different frequency from the serving cell, and should be able to easily measure the quality and cell information of the found neighboring cells. It is because the UE wants to connect with better cell if the quality of serving cell is bad and the quality of neibouring cell is good. The measurement for a cell using a different center frequency from the center frequency of the serving cell is called inter-frequency measurement. The UE should be able to perform inter-frequency measurement to report the measurement result at a suitable time.

If the UE supports the measurement for a mobile communication network, then the measurement of the mobile communication network can be implemented by the setting of the base station. At present, from a viewpoint of the LTE terminal, inter-RAT may include UTRA and GERAN according to the 3GPP standard specification, and may also include a CDMA 2000 system according to the 3GPP2 standard specification.

Figure 4:
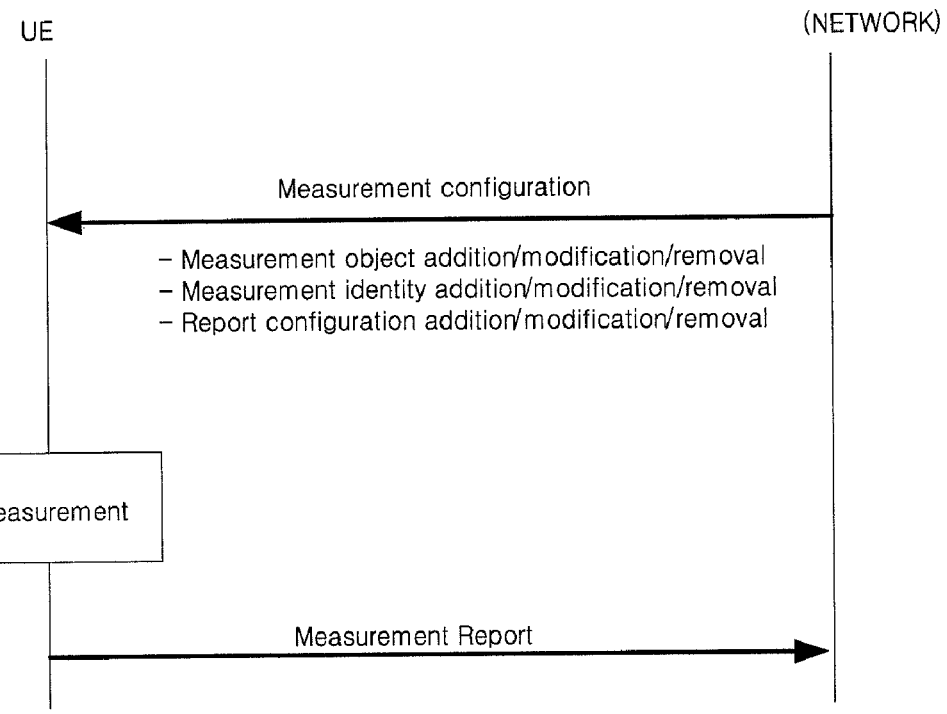
FIG. 4 is an exemplary view illustrating a measurement report procedure.

FIG. 4 is an exemplary view illustrating a measurement report procedure.

As illustrated in FIG. 4, the terminal may determine a measurement object according to a measurement configuration set by a base station, and then may report a measurement result to the base station. Thus, if the terminal receives a measurement configuration message (or any message that corresponds to the measurement configuration message), the terminal may perform the measurement based on the measurement configuration message. Thereafter, if a measurement result satisfies a measurement result report condition included in the measurement configuration message, the terminal may transmit the measurement result via a measurement report (MR) (or any message that corresponds to the MR). Here, the measurement configuration may include following parameters.

Measurement object: parameter indicating what object should be measured by the terminal. Usually, the measurement object that should be measured by the terminal is one of an intra-frequency measurement object, an inter-frequency measurement object, and an inter-RAT measurement object.

Reporting configuration: parameter indicating a measurement result reporting format and a time (or condition, case) for a transmission of the measurement result report message (i.e., report trigger time, report trigger condition, report trigger cases, etc).

Measurement identity: parameter indicating a type of reporting format and a time to report the measurement result report message with respect to which measurement object. The measurement identities connect the measurement object and the reporting configuration. The measurement identity may be included in the measurement result report message such that a measurement object and a type or time of report trigger can be identified by the measurement result report message itself.

Quantity configuration: parameter indicating a measurement unit, report unit setting, or a filter value for filtering of the measurement result value, etc.

Measurement gap: parameter indicating a time only used for measurement. This measurement gap is created because scheduling for a downlink transmission or an uplink transmission is not established. During this time, there is no data transmission between the terminal and serving cell.

In order to perform the measurement procedure explained above, the terminal may have a measurement object list, measurement reporting configuration list, and a measurement identity list. In general, E-UTRAN base station may configure only one measurement object to the terminal for a single frequency.

Figure 5:
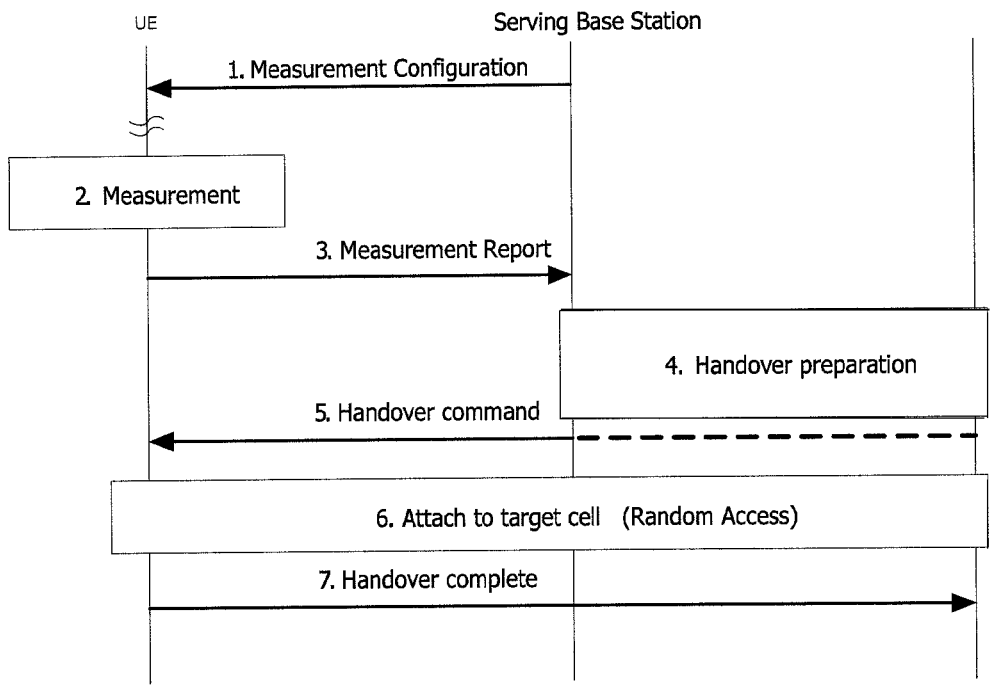
FIG. 5 is an exemplary view of signaling flow between a terminal and a network during a handover.

FIG. 5 is an exemplary view of signaling flow between a terminal and a network during a handover.

In general, a handover procedure is performed to support a mobility of a terminal that is in a RRC connected state. Namely, a continuity of the service must be maintained even when the terminal moves in a wireless communication system. Further, a quality of the service also has to be maintained at its highest degree. Here, a procedure for a movement of the RRC connected terminal from a currently access cell to a new cell is called as a handover.

As illustrated in FIG. 5, a network (base station) may transmit a measurement configuration to a RRC connected terminal (UE) for a mobility maintenance/management of the terminal. (Step 1) Thereafter, the terminal may perform a measurement based on the received measurement configuration. (Step 2) If a measurement result satisfies a measurement result report condition included in the measurement configuration, the terminal may report the measurement result to the network (i.e., current serving base station). (Step 3) Thereafter, the serving base station and a target base station may determine whether to perform the handover based on the measurement result. If the network (i.e., serving and target base stations) decides to perform the handover, the target base station may allocate radio resource(s) to provide a service to the terminal, and this can be called as a handover preparation. (Step 4) After the handover preparation, the target base station may transmit a handover command to the terminal through the serving base station. (Step 5) After receiving of the handover command, the terminal may attempts to access into the target base station (or attach to the target cell) through a random access procedure. (Step 6) Lastly, if the access into the target cell is successful, the terminal may transmit a handover complete message to the target cell, thereby completing of the handover procedure. (Step 7)

In general, the handover is performed when a quality of serving cell becomes bad. Therefore, if the handover procedure is required, it must be performed in urgent manner. If a transmission of the terminal's measurement result is delayed or if a transmission of the handover command is delayed due to a network problem, a communication between the terminal and network may become disconnected. As such, a time criticality of the handover may affect on a design of the handover procedure. For example, in order to minimize a total time for completing all handover procedure, the terminal may not read broadcast information of the target cell during the handover procedure. Rather, the broadcast information of the target cell may be read by the terminal after completion of the handover.

Here, the handover command (i.e., handover message) may include the following contents; 1) Target cell identification, 2) Target cell access information (e.g., bandwidth, center frequency, etc), 3) MAC configuration, 4) RLC configuration, 5) PDCP configuration, 6) UE identity, 7) Security configuration, 8) Measurement configuration.

In general, the handover message (or handover command) must include all necessary configuration(s) for performing an operation of the terminal in the target cell. However, since all necessary configurations(s) are included in the handover message, a size of the handover message may become too large, and this may cause a handover delay or a handover failure. Accordingly, if the size of handover message is relatively large, the network may use a default configuration (or setting) in order to minimize the size of the handover message.

After a reception of the handover message, the terminal may start to synchronize with the target cell. A description for uplink and downlink synchronizations between a terminal (UE) and a network (base station) will be given as following.

In order to maintain a communication link with the network, the terminal must align uplink/downlink synchronizations with the network. If the uplink/downlink synchronizations are not aligned, the terminal may not receive data transmitted through the downlink, and may not transmit data to the network through the uplink. Here, the network may continuously provide feedback information related to the uplink synchronization to the terminal such that the terminal can adjust the uplink synchronization. The feedback information may represent a time gap or time difference indicating a uplink synchronization between the terminal and the network. As mentioned above, the terminal may perform an adjustment for the uplink synchronization using the received feedback information from the network. In general, after receiving the feedback information from the network, if the terminal does not receive the feedback information again for a certain period of time, the terminal determines that the uplink synchronization is not properly aligned. To do this determination, once the terminal receives the feedback information from the network, the terminal starts to run a specific timer. This specific timer is called as a timer alignment timer (TAT) in LTE system. Here, the terminal may receive a TAT value for operating the TAT from the network, and the TAT value may be received through a dedicated signaling or a broadcast signaling transmitted from the network.

Figure 6:
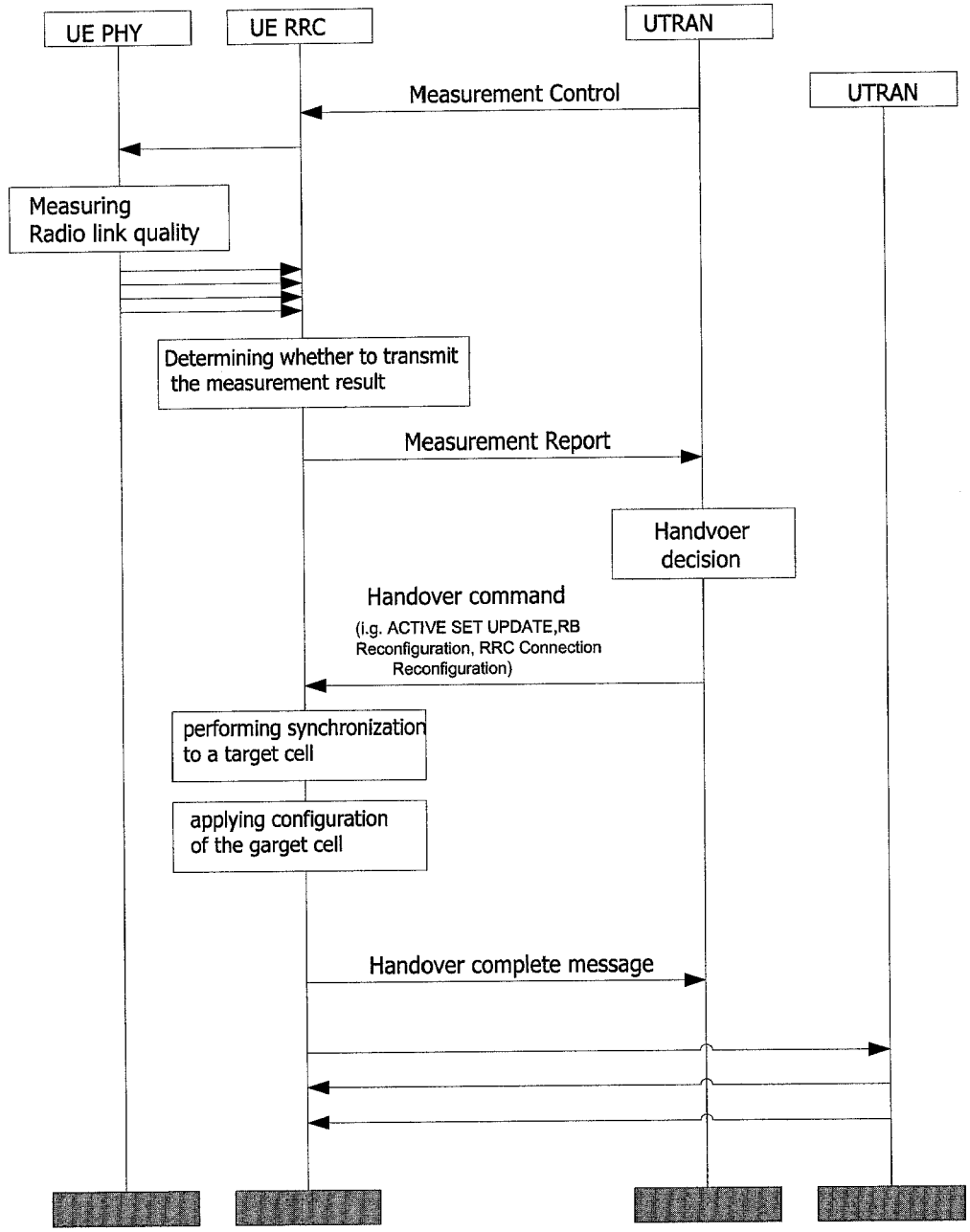
FIG. 6 is an exemplary handover procedure for UMTS.

FIG. 6 is an exemplary handover procedure for UMTS.

As illustrated in FIG. 6, a network (e.g., UTRAN, base station) may transmit a measurement control message to a terminal (UE). Here, the measurement control message may include a measurement quantity and a measurement object that should be used by the terminal during a measurement procedure. Also, the measurement control message may include a reporting quantity and a measurement reporting criteria that should be used by the terminal during a measurement result reporting procedure. Preferably, the measurement control message is received via a RRC layer of the terminal. After receiving the measurement control message, a physical layer of the terminal may perform to measure radio link quality values for a serving cell and neighboring cells indicated in the received measurement control message. Thereafter, if the measured radio link quality values satisfy the measurement reporting criteria, the terminal may transmit the measured radio link quality values to the network through a measurement report. After receiving the measurement reporting from the terminal, the network may perform a handover decision based o the received measurement report. If the network decides to perform the handover by its handover decision, in case of UMTS network, the network may transmit an active set update or a RB reconfiguration message to the terminal in order to notify the terminal to perform the handover. In case of LTE network, the RRC reconfiguration may be utilized to notify the terminal for performing the handover. After receiving the active se update or the RB reconfiguration message, the terminal may perform a synchronization procedure with a target cell. Further, the terminal may setup for configuration of the target cell. If the handover procedure is successfully completed, the terminal may transmit a RRC reconfiguration complete message to the network in order to notify the completion of the handover procedure. After the handover procedure is successfully completed, the terminal may start to transmit and to receive the data from the target cell.

The definitions related to the aforementioned measurement can be expressed as followings:

Measurement object: parameter indicating what object should be measured by the terminal. Usually, the measurement object that should be measured by the terminal is one of an intra-frequency measurement object, an inter-frequency measurement object, and an inter-RAT measurement object.

Measurement quantity: parameter indicating an amount of measurement should be performed by the terminal. In general, an amount of the measurement may be expressed as one of a CPICH Ec/No, CPICH RSCP, or Pathloss.

Reporting quantity: parameter indicating an amount of measurement result reporting.

Reporting configuration: parameter indicating a measurement result reporting format and a time (or condition, case) for a transmission of the measurement result report message (i.e., report trigger time, report trigger condition, report trigger cases, etc).

Measurement identity: parameter indicating a type of reporting format and a time to report the measurement result report message with respect to which measurement object. The measurement identities connect the measurement object and the reporting configuration. The measurement identity may be included in the measurement result report message such that a measurement object and a type or time of report trigger can be identified by the measurement result report message itself.

Quantity configuration: parameter indicating a measurement unit, report unit setting, or a filter value for filtering of the measurement result value, etc.

Measurement gap: parameter indicating a time only used for measurement. This measurement gap is created because scheduling for a downlink transmission or an uplink transmission is not established. During this time, there is no data transmission between the terminal and serving cell.

Measurement reporting criteria: parameter indicating in what condition the measured result should be reported.

The measurement can be divided into several different measurement types based on a center frequency of a target cell and RAT, as followings:

Intra-frequency measurement: A measurement for a cell using a center frequency that is equal to the center frequency of the serving cell. In general, this measurement is performed when a RAT of target cell is equal to a RAT of serving cell and a center frequency of the target cell is equal to a center frequency of the serving cell.

Inter-frequency measurement: A measurement for a cell using a center frequency that is different from the center frequency of the serving cell may be called as interfrequency measurement. In general, this measurement is performed when a RAT of target cell is equal to a RAT of serving cell and a center frequency of the target cell is not equal to a center frequency of the serving cell.

Inter-RAT measurement: this measurement is performed when a RAT of target cell is not equal to a RAT of serving cell.

A description for reporting events with respect to aforesaid measurements will be given as following:

Intra-frequency measurement:

Reporting event 1A: if a certain primary CPICH enters within a reporting range.

Reporting event 1B: if a certain primary CPICH leaves within the reporting range.

Reporting event 1D: notify that best cell has been changed.

Inter-frequency measurement:

Reporting event 2A: notify that beast frequency has been changed.

Reporting event 2B: if an estimated radio link quality of currently used frequency is lower than a certain threshold, and if an estimated radio link quality of a certain non-used frequency is higher than a certain threshold.

Reporting event 2C: if an estimated radio link quality of a certain non-used frequency is higher than a certain threshold.

Reporting event 2D: if an estimated radio link quality of a currently used frequency is lower than a certain threshold.

Inter-RAT measurement:

Reporting event 3A: if an estimated radio link quality of a currently used UTRAN frequency is lower than a certain threshold, and if an estimated radio link quality of other system is higher than a certain threshold.

Reporting event 3B: if an estimated radio link quality of other system is lower than a certain threshold.

Reporting event 3C: if an estimated radio link quality of other system is higher than a certain threshold.

Reporting event 3D: notify that best cell has been changed in the other system.

In general, the reporting range is used if the event 1A and the event 1B are triggered during the performance of the intra-frequency measurement. Here, if a radio link quality of a corresponding cell is higher than a particular condition, and an equation in below is satisfied, it is assumed that the terminal is entered into the reporting range. Thereafter, the terminal should transmit a measurement result to a network.

$$10 \cdot Log M_{New} + CIO_{New} \geq$$
$$W \cdot 10 \cdot Log\left(\sum_{i=1}^{N_A} M_i\right) + (1-W) \cdot 10 \cdot Log M_{Best} - (R_{1a} - H_{1a}/2),$$

where, M: measurement result of cell within reporting range, $CIO_{New}$: stored offset of each respective cell with respect to the corresponding cell, W: constant, $R_{1a}$: constant of Reporting range, $H_{1a}$: hysteresis parameter for the Event 1a.

In UMTS network, the handover may be divided into following two types:

Soft handover: performing a handover while maintaining a connection access with an existing serving cell. In UMTS system, this handover may be utilized by receiving an active set update message.

Hard handover: performing a handover by connecting to a target cell while releasing a connection access with an existing serving cell. In UMTS system, this handover may be utilized by receiving a message such as a RB reconfiguration message. In LTE system, this handover may be utilized by receiving a RB reconfiguration message.

Figure 7:
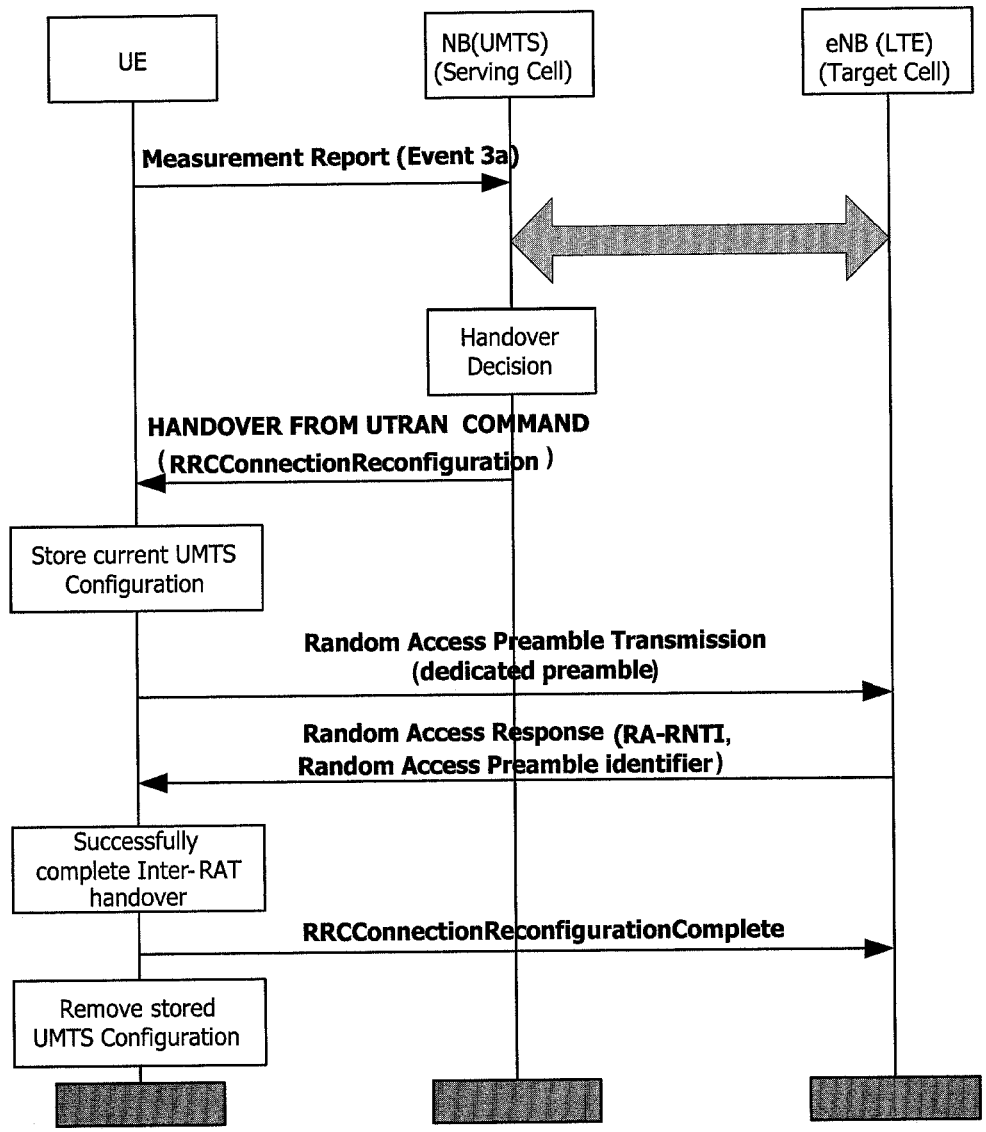
FIG. 7 is an exemplary view illustrating a successfully complete Inter-RAT handover from UMTS to LTE.

FIG. 7 is an exemplary view illustrating a successfully complete Inter-RAT handover from UMTS to LTE.

As described above for the event 3A, the terminal may transmit a measurement report message to a network, if an estimated radio link quality value of a currently used UTRAN frequency is lower than a certain threshold value and if an estimated radio link quality value of other system is higher than a certain threshold value. Therefore, if a handover from a UMTS system to a LTE system is possible, the UMTS network may transmit RRC connection reconfiguration message of the LTE system, which is a target RAT. Here, the RRC connection reconfiguration message may be capsulated into a Handover from UTRAN command message by an Inter-RAT message information element (IE). The Inter-RAT message may include a Handover command, a PS handover command, or a DTM handover command in a GSM system type. Also, the Inter-RAT may include a radio bearer reconfiguration in GERAN 1u system type and a DL-DCCH-message containing RRC connection reconfiguration in an E-UTRA system type. As aforesaid, after receiving a RRC connection reconfiguration message included in the Inter-RAT message, the terminal may perform the handover to a LTE system, which is a target cell. After receiving the RRC connection reconfiguration message, the terminal may store current configuration information with respect to the UMTS system, and may start to operate a timer (e.g., T304). Here, the terminal must complete the handover procedure successfully before the timer expires. A radio resource configuration dedicated information element (IE) may be existed in the RRC connection reconfiguration message, and the IE may include dedicated random access preamble information, which has no possibility for collusion with other preamble. After receiving the dedicated random access preamble from the network (base station), the terminal may transmit the preamble to the network.

After transmitting the random access preamble, the terminal may attempt to receive its own random access response within a random access response reception window, which is indicated through a handover command by the network. More specifically, the random access response information may be transmitted in a format of a MAC PDU (Protocol Data Unit), and the MAC PDU may be transmitted to a physical downlink shared channel (PDSCH). Further, in order to properly receive the data on the PDSCH by the terminal, control information may also be transmitted on a physical downlink control channel (PDCCH) from the network. Here, the control information may includes information related to the terminal receiving the PDSCH, information related to a radio resource frequency of the PDSCH, information related to time information of the PDSCH, or information related to transmission format of the PDSCH. If the terminal receives the PDCCH successfully, the terminal may receive a random access response transmitted on the PDSCH according to the information of the PDCCH. Here, the random access response may include a random access preamble identifier (ID), UL Grant, Temporary C-RNTI, or time alignment command (TAC), etc. After receiving the random access response, the random access procedure may be terminated. Thereafter, the terminal may transmit a RRC connection reconfiguration complete message to the LTE network by using UL Grant indicated in the random access response. Here, the RRC connection reconfiguration complete message is transmitted to the LTE network in order to notify the LTE network that the handover procedure is performed successfully. Thereafter, the terminal may remove stored UMTS configuration and may stop to operate the timer (e.g., T304).

Figure 8:
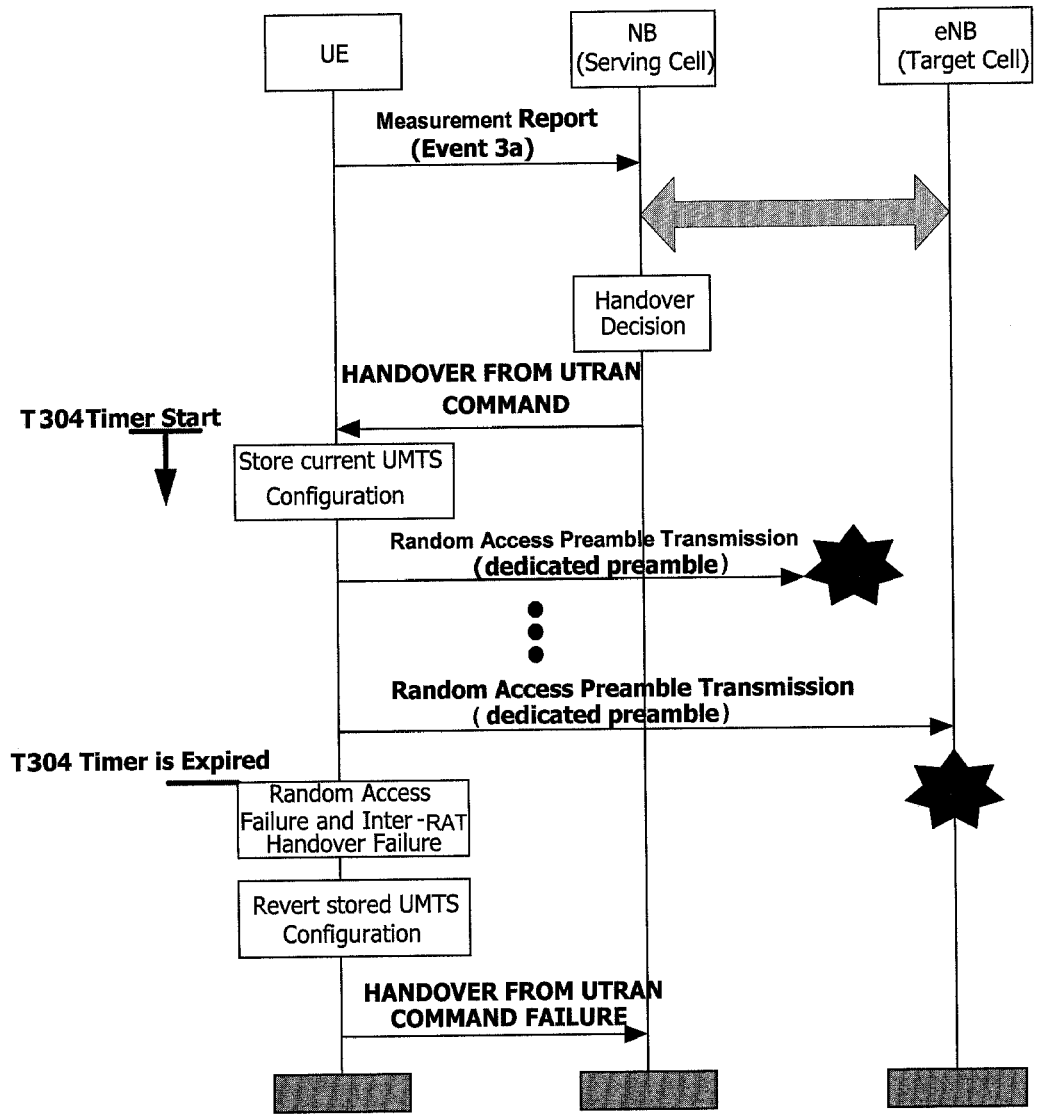
FIG. 8 is an exemplary view illustrating an Inter-RAT handover failure from UMTS to LTE.

FIG. 8 is an exemplary view illustrating an Inter-RAT handover failure from UMTS to LTE.

As illustrated in FIG. 8, the terminal should perform a handover to a target cell using an Inter-RAT information included in a 'Handover from UTRAN command' message. Here, the UMTS network (serving cell) may transmit a RRC connection reconfiguration message to the terminal. After receiving this message from the UMTS network, the terminal has to complete a handover procedure using configuration information of the target cell within a time period. (e.g., T304) However, if the terminal fails to complete the handover procedure within the time period, for example, if the configuration information of the target cell can not be applied by the terminal within the time period, the terminal may regard this as a handover failure. In this situation, the terminal may revert the configuration information of the target cell into previously stored UMTS configuration, and the terminal may transmit a 'Handover from UTRAN command failure' message to the UMTS network.

Figure 9:
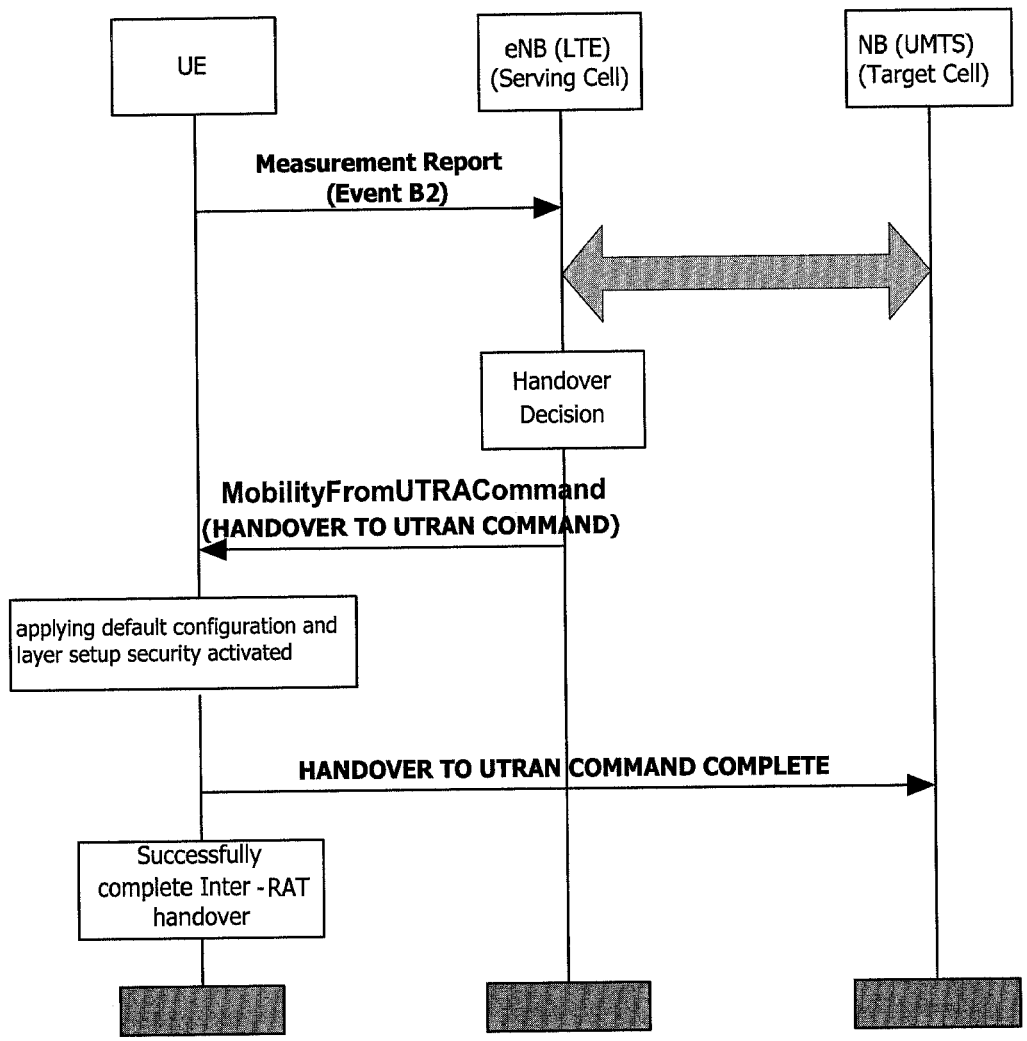
FIG. 9 is an exemplary view illustrating a successfully complete Inter-RAT handover from LTE to UMTS.

FIG. 9 is an exemplary view illustrating a successfully complete Inter-RAT handover from LTE to UMTS.

As described above, the event B2 is triggered if a radio link quality of a serving cell is lower than a threshold 1 and if a radio link quality of a neighbor RAT is higher than a threshold 2. When the event B2 is triggered, the terminal may transmit a measurement report message along with a corresponding radio link quality. After receiving such message, the network may transmit a handover command to the terminal after a handover decision. After receiving the handover command message, the terminal may perform a radio bearer configuration, a transport channel configuration, or a physical channel configuration by using information existed in the received message such as radio bearer (RB) configuration information, transport channel configuration information, and physical channel configuration information. During the physical channel configuration, the terminal must complete a physical channel (or layer) synchronization between the UMTS network and the terminal before a timer (e.g., T312 timer) expires. If the Inter-RAT handover procedure is completed successfully before the timer expires, the terminal may transmit a handover complete message to the UMTS network.

Figure 10:
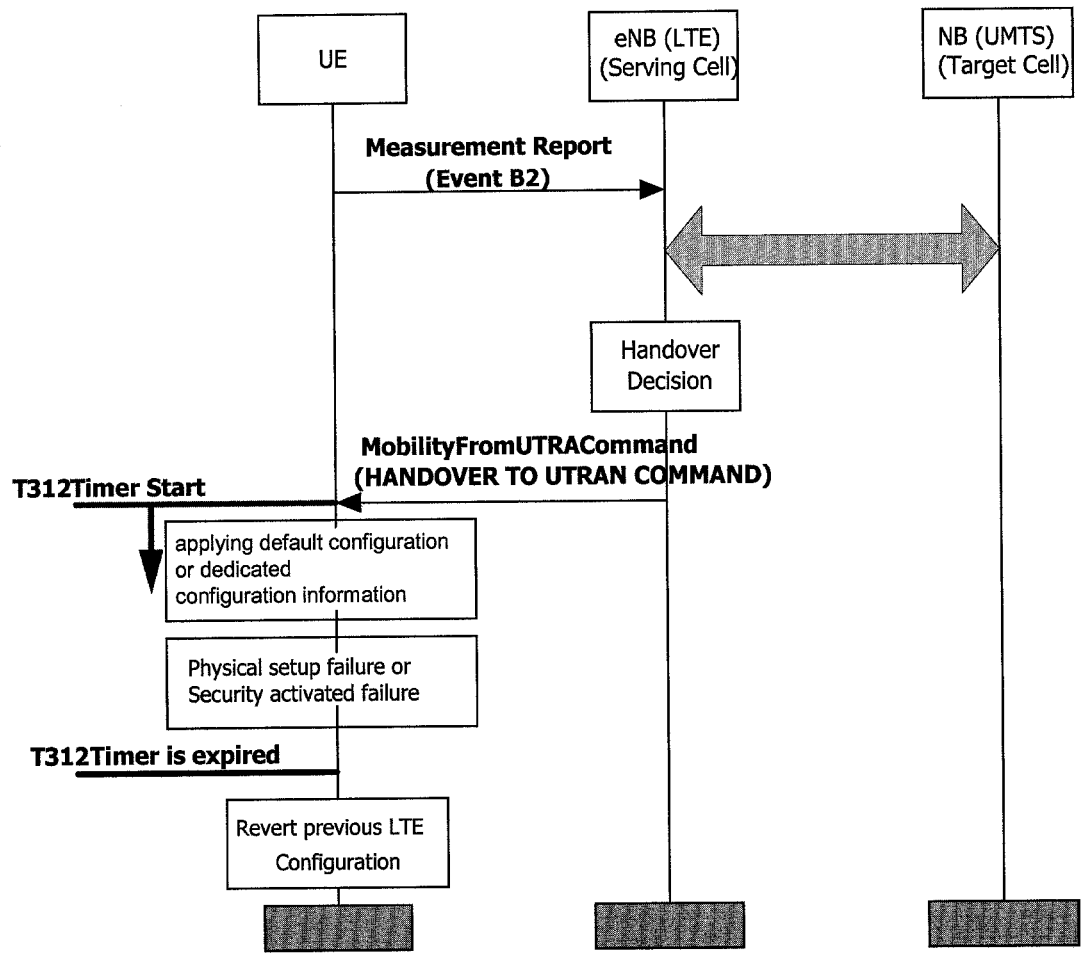
FIG. 10 is an exemplary view illustrating an Inter-RAT handover failure from LTE to UMTS.

FIG. 10 is an exemplary view illustrating an Inter-RAT handover failure from LTE to UMTS.

As illustrated in FIG. 10, the terminal may receive a 'Mobility from UTRA command' message from a LTE network. Here, this message may include handover information, and the terminal may receive configuration information of a target cell using this handover information. In general, this 'Mobility from UTRA command' message may be transmitted to the terminal in a format of a target RAT-message container. After receiving the 'Mobility from UTRA command' message, the terminal must complete a physical channel (or layer) synchronization within a certain time period. (e.g., T312) However, if the terminal fails to complete the handover procedure within the time period, the terminal may regard this as a handover failure. In this situation, the terminal may revert the configuration information of the target cell into previously stored LTE configuration, and the terminal may transmit a 'Handover from UTRAN command failure' message to the LTE network. Further, if the terminal fails to perform a physical setup or a security activated within the timer period, this may be also regarded as the handover failure.

Figure 11:
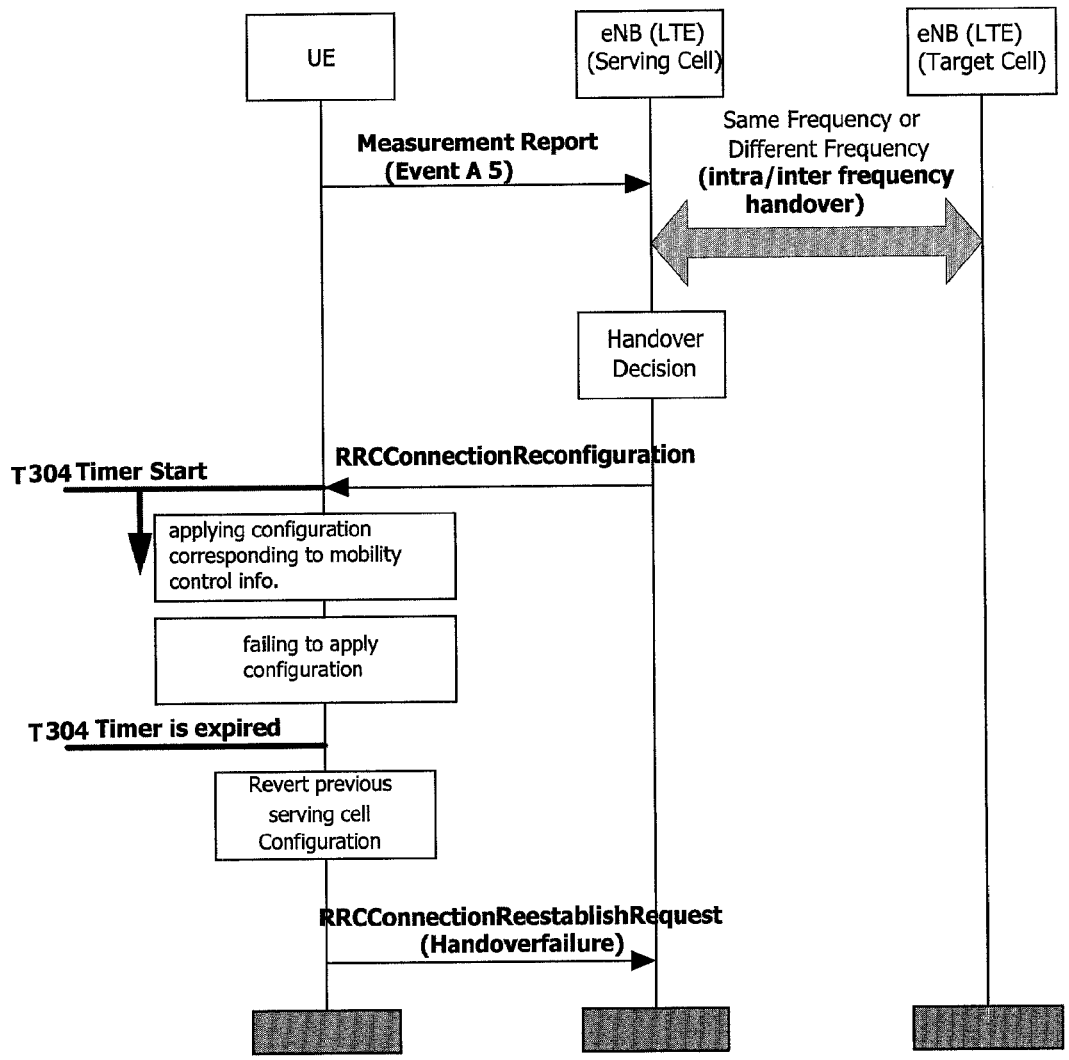
FIG. 11 is an exemplary view illustrating an Intra/Inter-frequency handover failure between LTE cells.

FIG. 11 is an exemplary view illustrating a handover failure between a LTE intra-frequency handover or a LTE inter-frequency handover.

As illustrated in FIG. 11, a handover failure may be caused between LTE cells. The terminal may receive a RRC connection reconfiguration message from a serving cell of a LTE network. Here, this message may include handover information, and the terminal may receive configuration information of a target cell using this handover information. After receiving the RRC connection reconfiguration message, the terminal may initiate to start a timer (e.g., T304), may attempt to apply configuration corresponding to mobility control information of a target cell within a certain time period. However, if the terminal fails to apply such configuration within the certain time period, the terminal may regard this situation as a handover failure. In this case, the terminal reverts the configuration information of the target cell into previous serving cell configuration, and the terminal transmits a 'RC connection reestablish request' message to a serving cell LTE network in order to notify the handover failure to the serving cell of LTE system.

If a network notifies a terminal to configure a new dedicated physical channel, the terminal may perform a synchronization process. During the synchronization process, a physical layer of the terminal may notify "In Sync" to a RRC layer of the terminal each time transmission interval (TTI) whenever the synchronization between the network and the terminal is coincided. If a physical layer of the terminal notifies a more than a certain number of "In Sync" to the RRC layer of the terminal within a certain time period indicated by a RRC layer of the network, the terminal may regard the synchronization process is performed successfully. However, if the physical layer of the terminal does not notify the more than the certain number of "In Sync" to the RRC layer of the terminal within the certain time period, the terminal may regard the synchronization process is not performed successfully. And, the terminal may identify this case as a "physical channel failure."

Hereinafter, Minimization Driving Test (MDT) will be described. A principal purpose of MDT is to change a test, which was executed using an actual vehicle by the existing operators, into an efficient scheme, in order to ensure coverage optimization. That is, one scheme is to detect a coverage hole. Coverage depends on a construction of a new base station or building or a user's usage environment. Thus, an operator must periodically execute a driving test, which causes consumption of a lot of costs and resources. MDT has a concept of using users' terminals instead of actual coverage measurement by the operators. This new function may affect a RRC structure.

Hereinafter, when a terminal stores a measurement log thereof will be described. In general, a terminal measures its log at a specific time point in order to reduce a driving test as much as possible. The terminal measures a network environment when predefined trigger conditions described as follows are generated. Table 1 exemplarily shows trigger conditions as to when a terminal log measurement is performed.

TABLE 1

| Measurement Trigger Conditions | |
| --- | --- |
| Measurement Trigger Condition | Description |
| Periodic Timer Based | A terminal measures a network environment for every specific time period notified by the network |
| Serving Cell becomes worse than threshold | When a reception level of a downlink radio channel of a serving cell connected to the current terminal is worse than a specific value notified by the network, the terminal measures a log at that time point. |

TABLE 1-continued

Measurement Trigger Conditions

| Measurement Trigger Condition | Description |
| --- | --- |
| RRC connection re-establishment/Cell Update after Radio Link Failure | After a RLF generation, if the terminal performs CELL Update process or RRC Connection Re-establishment process, the terminal measures a log at the time point when the process is generated. |
| Random Access Failure | The terminal measures a log at the time point of RACH access process failure. |

As shown in Table 1, the measurement trigger conditions for the terminal to store a log are divided into a period-based method and an event trigger-based method. The event trigger-based method is applied when a quality of a downlink radio link measured by a terminal is lower than a specific reference value, upon transmitting a RRC message due to a radio link failure, or upon an uplink radio link access failure.

In general, the method for storing a measurement log of a terminal includes a period-based method and an event trigger-base method. The simplest method is to inform a preset time period for storing a log from a network to a terminal such that the terminal can measure its log for every preset time period so as to inform the measurement log to the network. However, if the network sets an extremely short time period, the terminal may measure an unnecessary log too many times, and if the network sets an extremely long time period, a radio environment may become very bad before the log measurement after the time period. In this case, such information may not be terminal log information at an actually usable time point.

On the contrary to the period-based method, the event trigger-based method is configured such that a terminal measures its log when a preset condition is met. Compared with the period-based method, the event trigger-based method measures the log only when the log measurement of the terminal is actually needed, so the efficient log measurement may be allowed without an unnecessary measurement of the terminal log. The event trigger-based methods may include a method of measuring a terminal log by checking a radio quality of a downlink radio link of the terminal, and a method for measuring a terminal log by checking a radio quality of an uplink radio link of the terminal. If the terminal is present in the CELL_PCH or URA_PCH mode, the terminal has no data to send in uplink, so the terminal must measure the terminal log after checking the radio quality of the downlink radio link. The measurement of a terminal log after checking the radio quality of the downlink radio link may be performed in two cases, namely, at a time point of transmitting RRC reestablishment after radio link failure (RLF), and when the downlink radio link quality of a serving cell is lower than a specific threshold value.

A detailed description of a handover failure in a LTE network will be given as following.

The present invention may propose a method of storing a measurement result at a handover failure and providing the stored measurement result to a network.

In the present invention, after receiving a handover command (e.g., RRC connection reconfiguration, Mobility from UTRA command, etc) from a network, the terminal starts to operate a timer (e.g., T304, etc). If the terminal does not successfully perform a handover procedure completely before the timer expires, the handover procedure may be regarded as a handover failure.

In the present invention, after receiving the handover command from the network, the terminal starts to operate the timer. If the terminal can not transmit a handover complete message (e.g., RRC connection reconfiguration complete message) to the network before the timer expires, the handover procedure may be regarded as the handover failure.

In the present invention, after receiving the handover command from the network, the terminal starts to operate the timer. If the timer is expired, the handover procedure may be regarded as the handover failure.

In the present invention, a network transmitting the handover command (e.g., RRC connection reconfiguration, etc) may be a network that is connected with the terminal in a RRC connection.

In the present invention, a network transmitting the handover command may be a network that is not connected with the terminal in a RRC connection.

In the present invention, the network may be divided as per a RAT, and the RAT may be a LTE network, a UMTS network, eNodeB, or RNC.

A detailed description of a handover failure in a UMTS network will be given as following.

In the present invention, after receiving a handover command for performing a hard handover, the terminal starts to operate a timer (e.g., T312, etc). If the terminal does not successfully perform a handover procedure completely before the timer expires, the handover procedure may be regarded as a handover failure.

In the present invention, after receiving a handover command from the network, the terminal starts to operate a timer. If the terminal does not successfully perform a dedicated channel configuration procedure of a target cell before the timer expires, the handover procedure may be regarded as the handover failure.

In the present invention, after receiving a handover command from the network, the terminal starts to operate a timer. If the terminal does not receive a more than a certain number of "In Sync" before the timer expires, the handover procedure may be regarded as the handover failure.

In the present invention, after receiving a handover command from the network, the terminal starts to operate a timer. If the terminal detects a physical channel failure, the handover procedure may be regarded as the handover failure.

In the present invention, the stored measurement result may be a measured value at the handover failure is detected. Also, in the present invention, the stored measurement result may be a most recently measured value before the handover failure is detected. Further, in the present invention, the stored measurement result may be a measured value at a reception of the handover command from the network. Also, in the present invention, the stored measurement result may be measured values that periodically measured at each certain time period after the reception of the handover command from the network. In the present invention, the terminal may perform to start the handover procedure if the terminal receives at least one of followings messages from the network, that is, a RRC connection reconfiguration with mobility control info IE message, mobility from UTRA command message, a handover from UTRAN command message, and a handover to UTRAN command message. In the present invention, other types of messages may also be used to request the terminal to start operate the handover.

The radio environments measured and stored by the terminal may be as follows. First, the terminal may measure a serving cell and store the measurement value. Also, the terminal may measure a cell included in a neighboring cell list sent by the serving cell and store the measurement value. The terminal may also measure location information and time information relating to each cell to be measured and stores the same. The terminal may also measure Primary Scrambling Code (PSC) or global cell ID of each cell to be measured and store the same.

Table 2 exemplarily shows in detail which radio environment the terminal may measure.

TABLE 2

Details of Terminal Measurement

| What does the terminal measure? | Illustrative description |
| --- | --- |
| CPICH_RSCP | Signal code power received by terminal |
| CPICH Ec/No | Energy received by terminal for each chip proportional to power density |
| UE Transmission Power | Transmission power of terminal |
| Downlink BLER | Reception block error rate of terminal |

According to the present invention, in order to provide improved minimization driving test (MDT) scheme, the network may set to store the measurement result at a handover failure. Here, the network may notify the terminal regarding a number of measurements and a measurement period. Here, the period may indicate a specific time that the terminal should perform the measurement after receiving the handover message. Here, the number of measurement may be zero value, any integer value, or an infinite value. According to the present invention, if a handover failure exists, the terminal may transmit the measurement result along with a transmitting message at the time of the handover failure. According to the present invention, if the handover failure is not existed, the terminal does not store the measurement result, rather the terminal may remove the stored measurement result.

Figure 12:
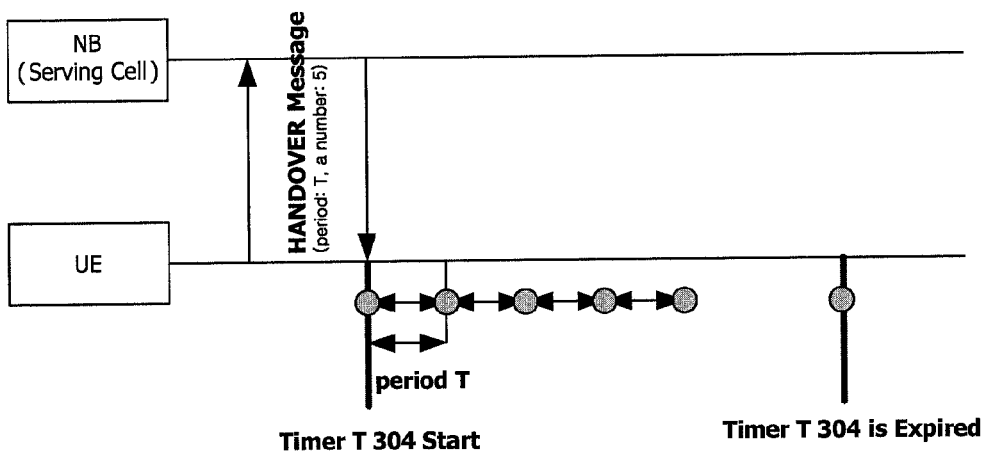
FIG. 12 is an exemplary view of a measurement reporting method according to the present invention after receiving handover message.

FIG. 12 is an exemplary view of a measurement reporting method according to the present invention after receiving handover message.

As illustrated in FIG. 12, the terminal may receive the handover message from a network. Here, the handover message may include a period and a number of measurements that should be performed. Thereafter, the terminal may store the measurement result at a time of the handover failure according to the period and the number of measurements. Thereafter, the terminal may transmit the stored measurement result to the network.

The present disclosure may provide a method of transmitting a measurement result at a handover failure in a wireless communication system, the method comprising: receiving, from a first network, a measurement configuration (MDT configuration) to be used at detecting the handover failure; detecting the handover failure; storing a measurement result if the handover failure is detected; and transmitting the stored measurement result to a second network, wherein the measurement configuration is received in a RRC connected mode, the measurement configuration is a minimization driving test (MDT) configuration, the handover failure is detected when a dedicated resource of a target network is not configured during a certain time period, the stored measurement result is a measured value at the handover failure is detected, the stored measurement result is a most recently measured value before the handover failure is detected, the first network is same as the second network, and the handover failure is detected if a terminal does not find a target network node for certain time period.

Although the present disclosure is described in the context of mobile communications, the present disclosure may also be used in any wireless communication systems using mobile devices, such as PDAs and laptop computers equipped with wireless communication capabilities (i.e. interface). Moreover, the use of certain terms to describe the present disclosure is not intended to limit the scope of the present disclosure to a certain type of wireless communication system. The present disclosure is also applicable to other wireless communication systems using different air interfaces and/or physical layers, for example, TDMA, CDMA, FDMA, WCDMA, OFDM, EV-DO, Wi-Max, Wi-Bro, etc.

The exemplary embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium may be accessed and executed by a processor. The code in which exemplary embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present disclosure, and that the article of manufacture may comprise any information bearing medium known in the art.

As the present disclosure may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

The invention claimed is:

1. A method of transmitting a measurement result performed by a user equipment (UE) in a wireless communication system, the method comprising:
receiving, from a network, a measurement configuration;
receiving, from the serving cell, a RRC connection reconfiguration message related to a handover, the RRC connection reconfiguration message comprising a predetermined timer value;
starting a T304 timer with a timer value set to the predetermined timer value;
determining a handover failure if a random access procedure is not completed until the T304 timer is expired;
storing handover failure information, if it is determined that the handover failure occurs; and
transmitting the handover failure information to a network, wherein the handover failure information comprises a measurement result of the serving cell based on measurements collected up to the moment of the occurrence of the handover failure, and a measurement result of at least one neighbor cell based on measurement collected up to the moment of the occurrence of the handover failure.

2. The method of claim 1, wherein the measurement configuration is received in a RRC connected mode.

3. The method of claim 1, wherein the measurement configuration is a minimization driving test (MDT) configuration.

4. The method of claim 1, wherein the handover failure information further comprises location information for the at least one cell.

5. The method of claim 1, wherein the handover failure information further comprises at least one Primary Scrambling Code (PSC) and at least one global cell ID for the at least one cell.

* * * * *